United States Patent [19]

Barry

[11] Patent Number: 5,059,959
[45] Date of Patent: Oct. 22, 1991

[54] CURSOR POSITIONING METHOD AND APPARATUS

[75] Inventor: George Barry, Saratoga, Calif.

[73] Assignee: Seven Oaks Corporation, Saratoga, Calif.

[21] Appl. No.: 740,641

[22] Filed: Jun. 3, 1985

[51] Int. Cl.$^5$ .............................................. G09G 5/08
[52] U.S. Cl. .................................... 340/709; 340/711
[58] Field of Search ............... 340/709, 706, 711, 710, 340/707; 178/18, 19; 367/118, 117, 907; 273/148 B

[56] References Cited

U.S. PATENT DOCUMENTS

| | | | |
|---|---|---|---|
| 3,668,685 | 6/1972 | Horvath | 340/709 |
| 3,883,861 | 5/1975 | Heartz | 340/706 |
| 4,028,619 | 6/1977 | Edwards . | |
| 4,124,838 | 12/1978 | Kiss | 367/907 |
| 4,253,166 | 2/1981 | Johnson | 367/117 |
| 4,293,222 | 10/1981 | Caruso et al. | 340/709 |
| 4,311,991 | 1/1982 | Rimbey | 340/365 R |
| 4,313,113 | 1/1982 | Thornburg | 340/709 |
| 4,319,189 | 3/1982 | Cullam, Jr. et al. . | |
| 4,367,465 | 1/1983 | Mati et al. | 340/707 |
| 4,369,439 | 1/1983 | Broos | 340/710 |
| 4,376,469 | 3/1983 | Longrod | 340/365 R |
| 4,378,552 | 3/1983 | Jalbert | 340/365 A |
| 4,384,633 | 5/1983 | Hoyer-Elletsen . | |
| 4,506,354 | 3/1985 | Hansen | 367/907 |
| 4,517,559 | 5/1985 | Deitch et al. | 340/712 |
| 4,524,348 | 6/1985 | Lefkowitz | 178/18 |
| 4,560,270 | 12/1985 | Wiklund et al. | 455/617 |
| 4,565,999 | 1/1986 | King et al. | 340/706 |
| 4,578,674 | 3/1986 | Baker et al. | 340/710 |

FOREIGN PATENT DOCUMENTS

| | | | |
|---|---|---|---|
| 55-49740 | 4/1980 | Japan . | |
| 57-109039 | 7/1982 | Japan . | |
| 0123916 | 7/1984 | Japan | 340/710 |
| 0586474 | 12/1974 | U.S.S.R. . | |
| 2139762 | 11/1984 | United Kingdom | 340/710 |

OTHER PUBLICATIONS

IBM Technical Disclosure Bulletin, vol. 27, No. 11, "Ultrasonic Cursor Position Detector" Apr. 1985.
Huffman, "Exact Position Detection with Finger Point and Feedback", IBM Technical Disclosure Bulletin, vol. 123, No. 6, Nov. 1980.
Fajans, "Acoustical Touch Panel", IBM Technical Disclosure Bulletin, vol. 20, No. 7, Dec. 1977.
"Thumbwheel Positional Control Unit", Leon; IBM Technical Disclosure Bulletin, vol. 21, No. 7; Dec. 1978.
Lisk, "Electronic Keyboard", IBM Technical Disclosure Bulletin, vol. 20, No. 1, Jun. 1977.
Calcagano et al., "Magnetoacoustic Keyboard", IBM Technical Disclosure Bulletin, vol. 21, No. 9, Feb 1979.

Primary Examiner—Alvin E. Oberley
Attorney, Agent, or Firm—Fliesler, Dubb, Meyer & Lovejoy

[57] ABSTRACT

A cursor-aiming system for use with a screen having a movable cursor is provided with means for generating a field and means for changing the position of the cursor on the screen in response to the movement of an operator's finger in the field. In one embodiment there is provided a plurality of monostatic sonars and in another embodiment there is provided a plurality of bistatic sonars. The sonars are mounted for the transmission and reception of acoustic signals through apertures located in a spaced relationship along the upper margin of a terminal keyboard. In typical embodiments the signal frequency is approximately 200 KHz. Either pulsed or continuous-wave signals may be employed. When pulses are used, a typical pulse rate is 200 pps with a pulse width of 25 microseconds. Multiple frequency systems comprise alternate pulses of 200 and 250 KHz. Interpulse intervals are dithered to discriminate against around-the-timebase echoes.

32 Claims, 5 Drawing Sheets

CURSOR POSITIONING METHOD AND APPARATUS

BACKGROUND OF THE INVENTION

1. Field of the Invention

The present invention relates to a method and apparatus for controlling the movement of a cursor on the screen of a computer terminal in general and to a method and apparatus for controlling the movement of a cursor on the screen of a computer terminal in a manner which corresponds to the movement of a finger in a fan-shaped field which extends vertically from a terminal keyboard in particular.

2. Description of Prior Art

Various pointing devices are used by the operators of computer terminal equipment for controlling cursor speed of movement and position on a display. Changes in cursor position may be made between arbitrary points on the display or relative to an object appearing on the display. The object may be an item to be selected from a menu, a word or a character in text, or an element in a design (a musical note or a circuit component, for examples).

Currently used cursor-positioning techniques and apparatus comprise: cursor-movement keys (often marked with up-, down-, right-, and left-pointing arrows), joysticks, trackballs, mice, pucks, light pens, touch screens, and touch tablets. Digitizing tablets can also be used; however, these are usually higher-precision devices and are intended primarily to enter absolute coordinate values into a computer rather than just to position a cursor relative to existing displayed material.

In practice, all of the competing techniques have advantages and disadvantages, but none are as satisfactory, especially to the untrained user, as the nearly unconscious act of a handwriter who moves the tip of a pen or pencil to a point of interest.

Cursor movement keys are generally acknowledged to be the fastest available technique for text editing, at least with a proficient typist editing from a marked draft. Less dedicated users are better off with a mouse; it is more intuitive, requires less training and practice, and is less distracting. However, the mouse is not without its drawbacks. It requires clear deskspace in which to operate and further, in each operation, one must first find the mouse, move it, and then refind one's hand position on the keyboard.

In general, all of the prior known alternative cursor-positioning techniques and apparatus, with the exception of a small, thumb-operated trackball located on a keyboard, share the problem of losing one's place on the keyboard.

SUMMARY OF THE INVENTION

In view of the foregoing, principal objects of the present invention are a novel method and apparatus for controlling cursor speed of movement and position on a display in response to the movement of an object in a field which extends vertically from a terminal keyboard.

As broadly conceived, the method and apparatus of the present invention comprises means for providing an acoustic, an electric, an electromagnetic, or other field in a terminal keyboard and means responsive to the movement of an object in the field, such as a finger, for controlling the speed of movement and position of a cursor on a display.

In a first embodiment of the present invention there is provided a pair of acoustic transducers. The transducers are located in a spaced relationship along the upper edge or margin of a terminal keyboard. Each is coupled to a transmitter for generating a fan-shaped field of acoustic pulses and to a receiver for processing reflected pulses or echoes corresponding to the position of a target, e.g. an operator's finger, moving in the field. The echo delays are measurements of the target range from each transducer.

Coupled to the receiver is a cursor movement control apparatus, such as a programmed microprocessor, for controlling movement of a cursor on a display screen of the terminal. In practice, the direction of cursor movement corresponds to the direction of finger movement in the field, but mapping from the field to the screen is not scaled one-to-one and is also dependent upon the speed of finger movement in the field. For example, in conjunction with the microprocessor, an operator can produce a full-screen cursor deflection with a short, quick finger motion, while still maintaining the ability to easily select, with slower finger movement, single characters and lines of text on the screen. Moreover, two identical finger movements anywhere in the field will produce the same movement of the cursor on the display. A degree of hysteresis is provided so that cursor movement on the screen is smooth, i.e. without jitter due to normal trembling of an operator's extended finger, and apparently instantaneous relative to finger movement.

In a second embodiment of the present invention there is provided a plurality of transducers, some dedicated to transmitting and others to receiving acoustic pulses. In this embodiment, two of the transducers are located in a spaced relationship along the upper edge or margin of a terminal keyboard and are coupled to a transmitter for providing an acoustic field of pulses as described above with respect to the previous embodiment. A third transducer is located between the field generating transducers and is coupled to a receiver for processing echoes from a target, e.g. operator's finger, also as described above with respect to the previous embodiment.

In either or both of the above-described embodiments, the frequency of the pulses transmitted, instead of comprising a single frequency, e.g. 200 KHz, may comprise a plurality of selected frequencies for minimizing, if not altogether avoiding, the effects of multiple destructively-interfering echoes from the complex surfaces of an operator's finger. For example, alternate pulses may comprise 200 KHz and 250 KHz, respectively.

In either or both of the above-described embodiments, the interval between adjacent pulses may be dithered. By varying the interval between adjacent pulses, around-the-timebase echoes from fixed objects, e.g. ceiling or wall, can be rejected. One method for effecting the cancellation is by averaging the amplitude of the return signals over several pulses.

In a third embodiment of the present invention, a plurality of transducers are provided arranged as described above in the second embodiment; however, the transmitted and received signals are continuous wave (CW) acoustic signals rather than pulses. The signals are transmitted from the transducer centrally located along the upper edge of the keyboard. The two spaced transducers are coupled to receivers for processing the echoes received from a target. In this embodiment the motion of the operator's finger is determined directly from the doppler shift of the reflected signals rather than being inferred from the changing range of the pulse echoes as in the first two embodiments.

BRIEF DESCRIPTION OF THE DRAWING

The above and other objects, features and advantages of the present invention will become apparent form the following detailed description of the accompanying drawings in which.

DETAILED DESCRIPTION OF THE DRAWING

Referring to FIGS. 1, 2, 3 and 4, there is provided in accordance with the present invention a terminal keyboard designated generally as 1 comprising a housing 2 in which is movably mounted a plurality of keys 3. Above the upper row of keys 3 there is provided a pair of spaced apertures 4 and 5. As will be further discussed below, while the size of the apertures 4 and 5 may vary depending upon field configuration and system acoustic frequency, for a relatively thin fan-shaped field of 200 KHz signals, for example, pulses, suitable apertures would be 1 mm. ×20 mm. Other beam-forming techniques (arrays of holes, reflectors, etc.) could, of course, be used.

As shown more clearly in FIG. 2, mounted below the apertures 4 and 5 there is provided a pair of acoustic transducers 6 and 7, respectively. The transducers 6 and 7 are adapted for transmitting and receiving acoustic pulses and are coupled to contacts A and B of a transducer selector switch S1 by means of a pair of signal lines 8 and 9, respectively. The transducer switch S1 also comprises a pole C. The pole C of the switch S1 is coupled to a pole C of a transmit/receiver switch S2 by means of a line 10. The switch S2 also comprises a pair of contacts A and B. Contact B is coupled to the output of a transmitter amplifier 15 by means of a line 16. An input of amplifier 15 is coupled to an output of a waveform generator 17 by means of a line 18. The contact A of switch S2 is coupled to an input of a receiver amplifier 20 by means of a line 21. An output of the amplifier 20 is coupled to a detector 22 by means of a line 23. An output of the detector 22 is coupled to a microprocessor 24 by means of a line 25. An output of the microprocessor 24 for transmitting digital cursor-aiming signals to a terminal or computer having a screen with a movable cursor (not shown) is provided on a line 26.

Control signals for controlling the position of the pole C of the switch S1 are provided by the microprocessor 24 as shown by the dashed line 30. Control signals for controlling the position of the pole C of the switch S2 are provided by the microprocessor 24 as shown by the dashed line 31. Control signals for controlling the amplifier 15 are provided by the microprocessor 24 as shown by the dashed line 32. Control signals for controlling the waveform generator 17 are provided by the microprocessor 24 as shown by the dashed line 33. Control signals for controlling the amplifier 20 are provided by the microprocessor 24 as shown by the dashed line 34.

It should be understood that while switches S1 and S2 are shown as simple mechanical switches, in practice, they comprise solid state devices.

Figures 3, 4:
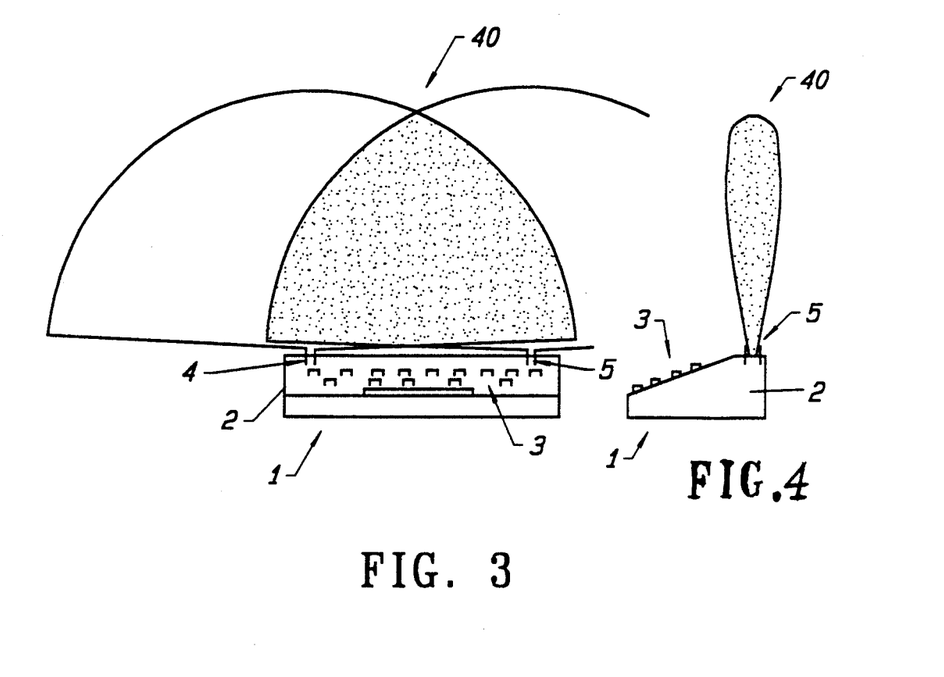
FIG. 3 is a front elevation view of the sensitive field generated by the embodiment of FIG. 2.
FIG. 4 is a side elevation view of the field of FIG. 3.

Referring to FIGS. 3 and 4, a fan-shaped sensing beam 40 is formed by transducers 6 and 7 connected to form two sonar systems which locate the position of an operator's finger as the intersection of two constant-range lines measured by the systems. The beams are shaped by the apertures of the transducers and the sonar wavelength (determined by the acoustic frequency).

In practice, a thin fan-shaped beam is desirable so that the front surface of the sensitive region, shown as a dotted area, will be abrupt and nearly a plane. The sensitivity to range change needs to be on the order of a millimeter, and this fact determines the bandwidth and, indirectly, the lowest sonar frequency which can be used. Together, the constraints set the minimum frequency at about 200 KHz and the size of the transducer apertures at about 1 mm. wide to 20 mm. high. These values fit satisfactorily with keyboard design (see FIG. 1). Of course, higher frequencies and correspondingly smaller apertures may be used; however, as a practical matter acoustical absorption limits the highest usable frequency to a value of several megahertz.

Figure 5:
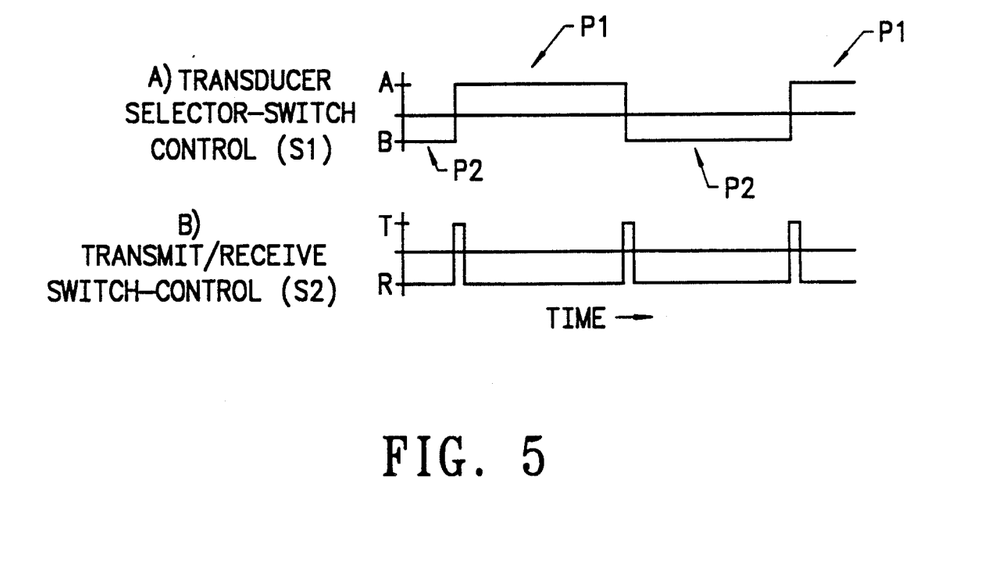
FIGS. 5a and 5b are timing diagrams of apparatus according to the present invention.

Referring to FIG. 5a and 5b, FIG. 5a shows that during a period P1 transducer 6, and during a period P2 transducer 7 is coupled to either transmitter amplifier 15 or receiver amplifier 20. Periods P1 and P2 correspond to the periods of the transmitted pulses FIG. 5b. FIG. 5b shows that the transducers 6 and 7 are coupled to the transmitter amplifier 15 for a short period, e.g. 25 microseconds, and to the receiver amplifier 20 for the remainder of the pulse period. The sampling rate or sonar pulse repetition frequency (PRF) is chosen so that the cursor response appears instantaneous to the operator. For this purpose, a rate of 20 samples per second appears to be adequate. The maximum PRF is set by the dimensions of the sensitive region. Accordingly, rates as high as 200 pps are usable and may be desirable, since higher rates permit effective signal averaging.

For good signal-to-noise ratios, the range sensitivity, i.e. the minimum range change which can be detected, can be considerably less than the pulse length. For example, 1 mm. sensitivity can be obtained with a pulse length of 8 mm. (25 microseconds). In this case, the system bandwidth, which is the reciprocal of the pulse length, is 40 KHz.

With a pulse rate of 200 pps and a pulse width of 25 microseconds, the interpulse interval is 4.975 milliseconds. While exactly uniform interpulse intervals may be used, it is preferable to dither, i.e. vary, the interpulse interval between successive pulses to permit signal-processing software to discriminate against undesired, around-the-timebase echoes, such as for example, echoes off the ceiling or other fixed objects in the vicinity of the terminal keyboard. It will be appreciated that by dithering the interpulse interval, signal averaging will reduce the amplitude of around-the-timebase echoes.

If a target behaved as a small sphere, isolated in the air above the keyboard within the sensitive area of the fan-shaped beam, then the echo would be only a single pulse, a replica of the transmitted signal. However, a user's finger is more complex and may return multiple echoes of various amplitudes and phases. If two such echoes are nearly alike in range and amplitude and of opposite phase, they may cancel, making a finger invisible. This problem can be overcome, either by shortening the pulse so that the echoes do not overlap in range, or by changing the frequency enough so that the range difference is no longer exactly half a wavelength. Because shortening the pulse reduces its energy, it is more practical to employ multiple frequences; for example, 200 and 250 KHz. Accordingly, in an embodiment of the present invention, 200 and 250 KHz pulses, alternating between successive pulses, are employed. More than two frequencies may be used, but two appear to be sufficient.

In operation, the present apparatus permits an operator to reposition a cursor on a screen on a computer terminal display by lifting a forefinger from the keyboard and moving the finger in the desired direction of cursor movement. To prevent unintentional hand or finger motions from affecting the cursor, the apparatus is normally deactivated and the operator must enable it when desired by holding down a control key with one hand while gesturing with the other. The region in which finger motion is effective is limited to the fan-shaped dotted area shown in FIGS. 3 and 4. Its horizontal extent is limited to approximately the length of the keyboard 2 and it extends vertically about the same distance. The cursor is picked up when the finger pierces the sensitive region or when the control key is depressed, whichever comes later, and the cursor is left where it is when the finger leaves the region or the control key is released, whichever occurs first. It should be noted that the direction of cursor movement corresponds with the direction of finger movement, but mapping from the sensitive area to the screen is not scaled one-to-one and is also dependent upon the speed of finger movement. For example, the operator can produce a full screen cursor deflection with a quick, but much shorter, finger motion while still maintaining the ability to easily select single characters and lines.

Signals from the sensing sonars are processed in the microprocessor 24 in several stages. First, a measurement of the target (finger) position is obtained in range-range coordinates and transformed into x-y coordinates, which approximate the operator's concept of vertical and horizontal position. Then the target motion is deduced from successive position measurements and combined with position data to form an "effective position". This makes it possible for the operator to substitute quick finger motions for wide ones and allows the operator to sweep the entire screen without a large motion which would cause the operator to tend to lose his or her hand position on the keyboard.

In a word processing application, the calculation of the effective vertical position is provided with some hysteresis, making it easy for the operator to hold a cursor on a particular line. Finally, the calculated desired cursor position is compared with the actual cursor position and control signals are generated by the microprocessor 24 to cause the host terminal or computer to adjust the cursor position. All of the signal processing is conveniently performed by the microprocessor 24 using conventional well-known programming techniques.

Figure 6:
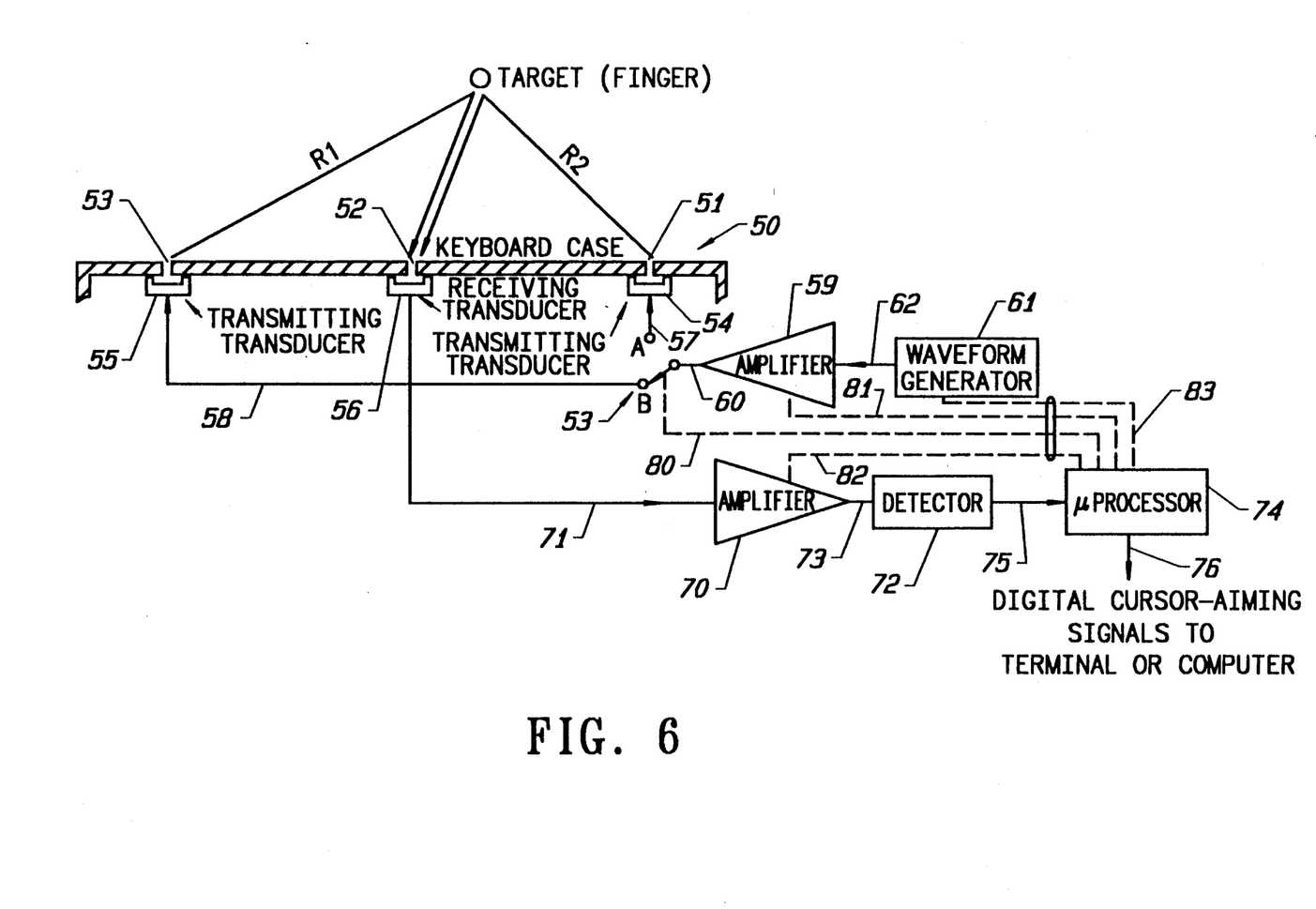
FIG. 6 is a block diagram of an acoustic-cursor-aiming system according to the present invention comprising two bistatic sonars.
Figures 7, 8:
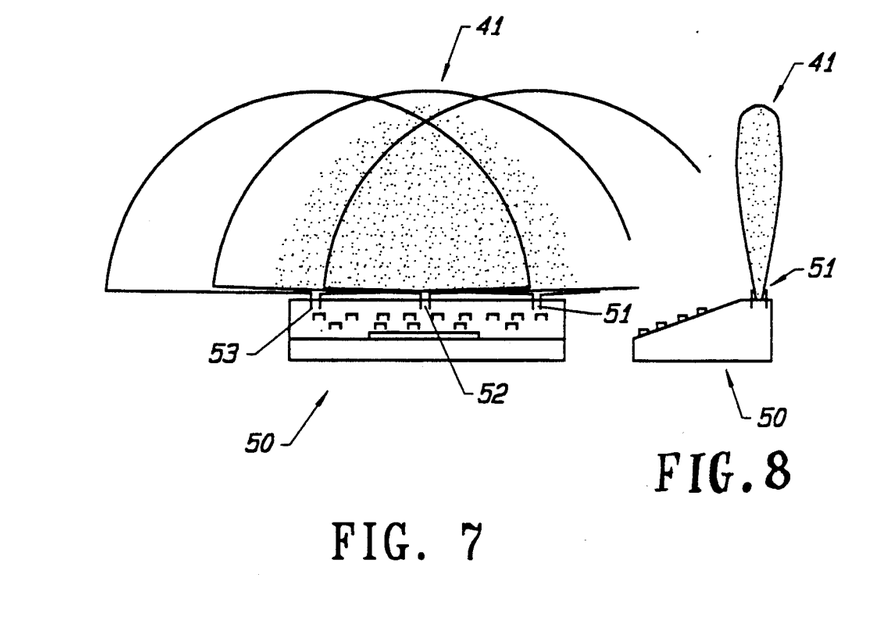
FIG. 7 is a front elevation view showing the sensitive acoustic field area of the embodiment of FIG. 6.
FIG. 8 is a side elevation view of the field of FIG. 7.

Referring to FIGS. 6-8, there is provided in another embodiment of the present invention a keyboard terminal designated generally as 50. Keyboard terminal 50 is substantially identical to keyboard terminal 1 of FIG. 1 except that in place of the apertures 4 and 5, there is provided in the embodiment of FIG. 6 a plurality of apertures 51, 52 and 53. Located beneath the apertures 51 and 53 there is provided a pair of transmitting acoustic transducers 54 and 55, respectively. Beneath the aperture 52 there is provided a receiving transducer 56. The transducers 54 and 55 are coupled to contacts A and B of a transducer selector switch S3 by means of a pair of signal lines 57 and 58, respectively. A pole of the switch S3 is coupled to the output of a transmitting amplifier 59 by means of a signal line 60. An input to the amplifier 59 is coupled to an output of a waveform generator 61 by means of a signal line 62. The output of the receiving transducer 56 is coupled to an input of the receiving amplifier 70 by means of a signal line 71. The output of the amplifier 70 is coupled to a detector 72 by means of a signal line 73. An output of the detector 72 is coupled to a microprocessor 74 by means of a signal line 75. An output of the microprocessor 74 provides digital cursor-aiming signals to a computer or terminal (not shown) by means of a signal line 76. Control signals for controlling the position of the pole of the switch S3 are provided by the microprocessor 74 as shown by the dashed line 80. Control signals for controlling the amplifier 59 and 70 are provided by the microprocessor 74 as shown by the dashed lines 81 and 82, respectively. Control signals for controlling the waveform generator 61 are provided by the microprocessor 74 as shown by the dashed lines 83.

As described above, the region of adequate sensitivity is shown by the dotted region in FIGS. 3 and 4 which is the intersection of the regions covered by the two monostatic sonars. The corresponding region 41 in FIGS. 7 and 8 is the intersection of the region covered by the two bistatic sonars. Each of these sonars covers a region which is determined by both the transmitting and receiving beam shapes as shown by the solid lines therein.

Figure 1:
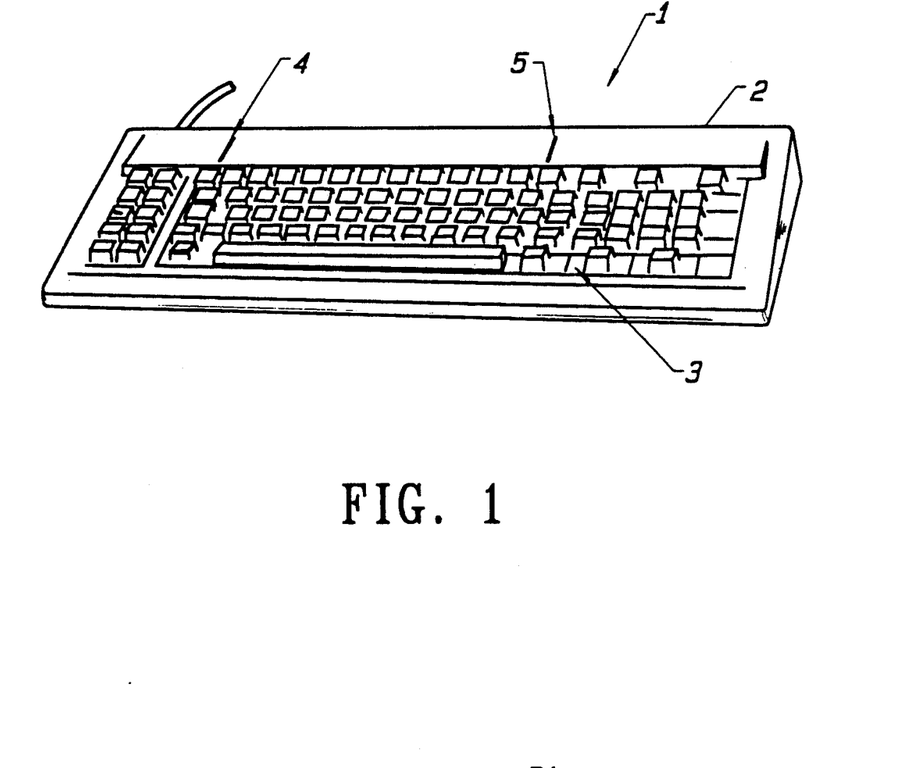
FIG. 1 is an isometric view of a terminal keyboard equipped with transducer apertures and apparatus in an acoustic, cursor-aiming system according to the present invention.
Figure 2:
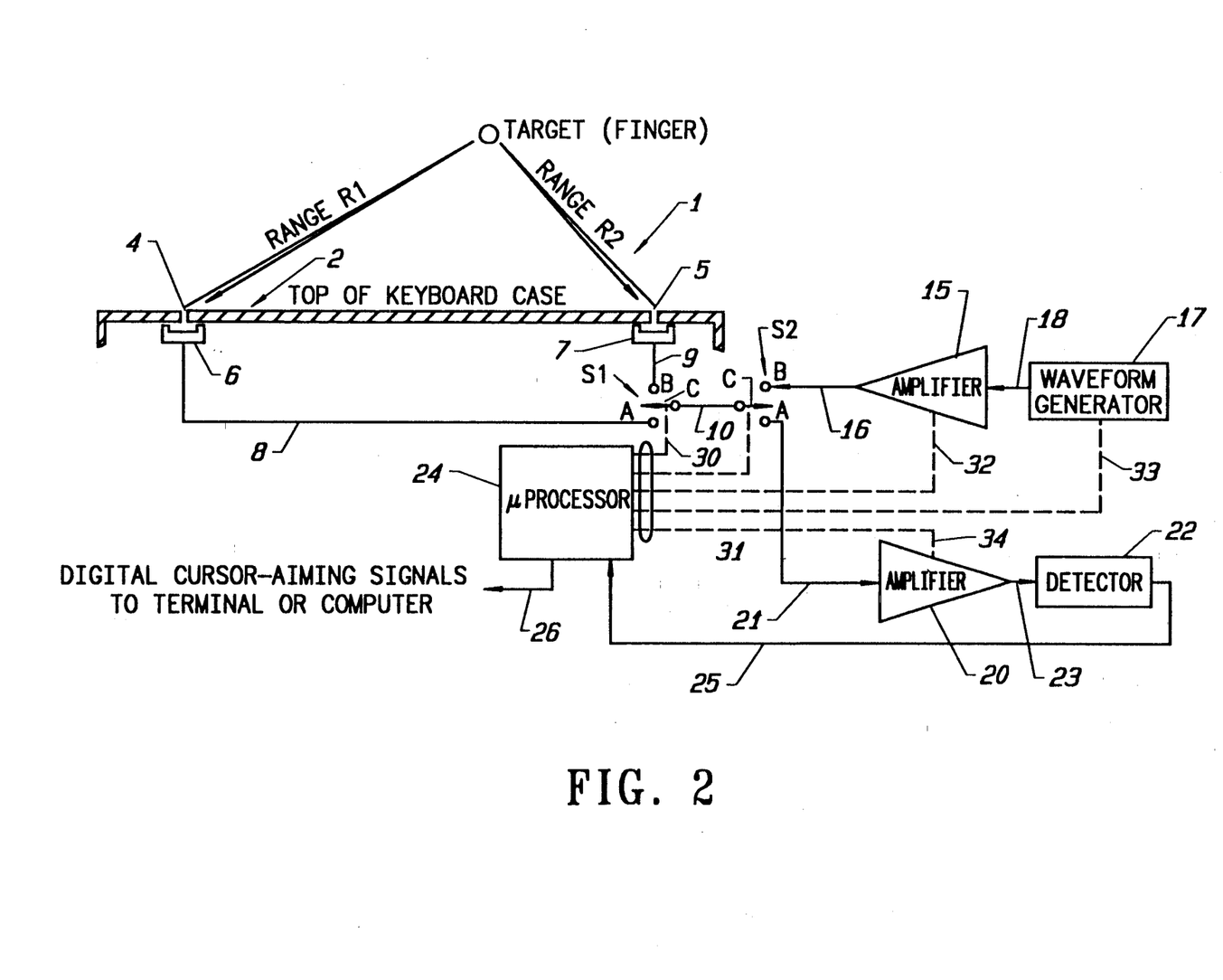
FIG. 2 is a block diagram of an acoustic-cursor-aiming system according to the present invention comprising two monostatic ranging sonars.

While the operation of the embodiment of FIG. 6 is substantially identical to the operation of the embodiment of FIG. 2, the use of separate transducers for transmitting and receiving alleviates transducer ringing problems which are troublesome at short distances.

Figure 9:
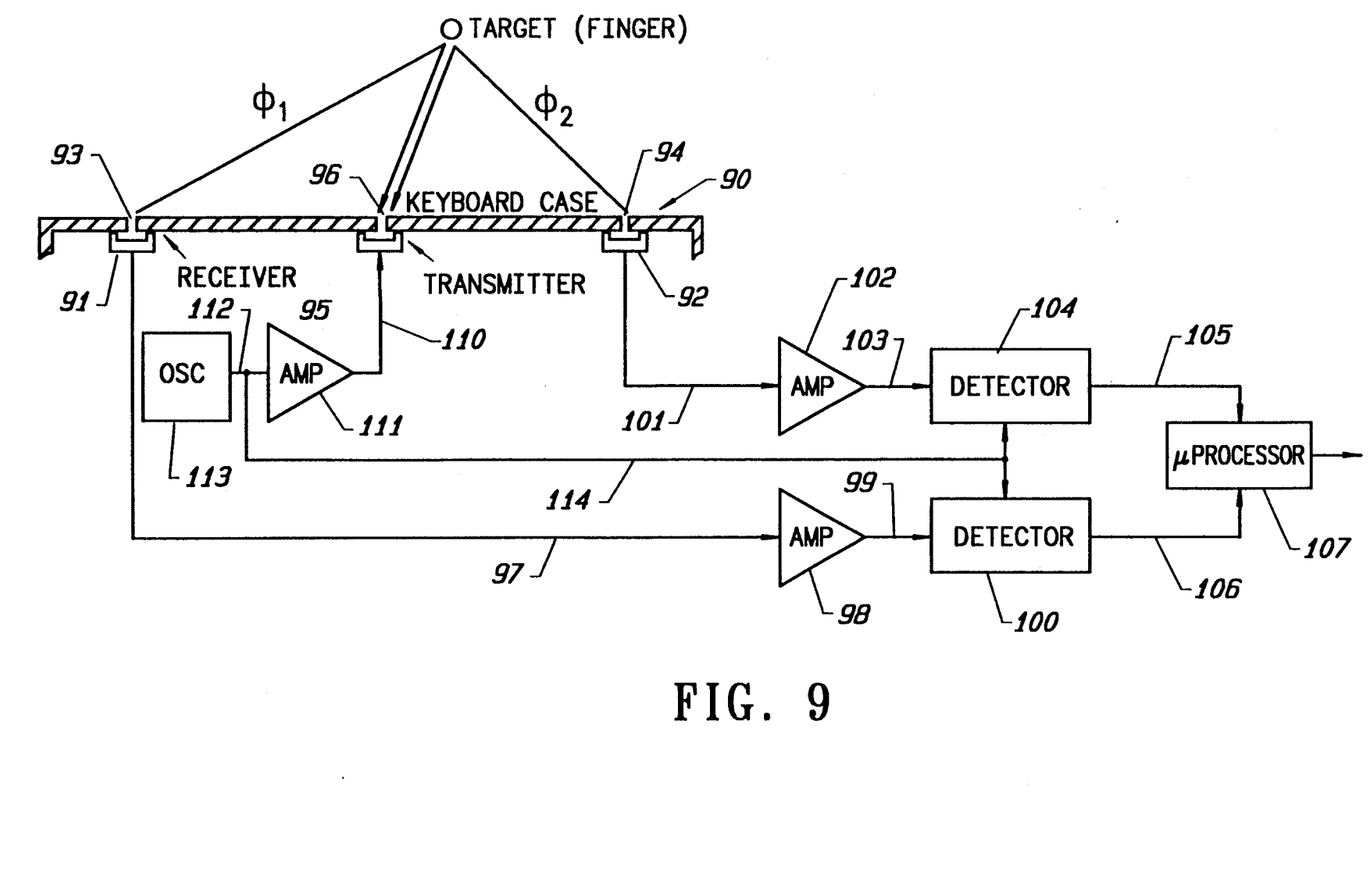
FIG. 9 is a block diagram of an acoustic-cursor-aiming system according to the present invention comprising two bistatic CW sonars.

Referring to FIG. 9, there is provided in accordance with a third embodiment of the present invention a keyboard 90. In the keyboard 90 there is provided a pair of laterally spaced receiving transducers 91 and 92 mounted below a pair of apertures 93 and 94, respectively, and a centrally located transmitting transducer 95 located below an aperture 96. Coupled to the receiving transducer 91 by means of a line 97 there is provided an amplifier 98. Coupled to the output of the amplifier 98 by means of a line 99 there is provided a phase detector 100. Coupled to the receiving transducer 92 by means of a line 101 there is provided an amplifier 102. Coupled to the output of the amplifier 102 by means of a line 103 there is provided a phase detector 104. The outputs of the phase detectors 100 and 104 are coupled by means of a pair of lines 105 and 106 to a microprocessor 107.

Coupled to the transmitting tranducer 95 by means of a line 110 is the output of an amplifier 111. Coupled to the input of the amplifier 111 by means of a line 112 is the output of an oscillator 113. The output of the oscillator 113 is also coupled to the reference signal inputs of phase detectors 100 and 104 by means of a line 114.

In operation, an acoustic continuous wave (CW) signal is provided from the aperture 96 by the oscillator 113, amplifier 111 and transmitting transducer 95. Typically, the CW signal comprises a frequency of 200 KHz. It should be noted, however, that a lower frequency may be used and that the lower limit of the frequency is restricted by the size of the aperture required therefor, while the upper limit of the frequency is generally restricted by considerations of absorption. The receiving transducers 91 and 92 receive echoes from a target within the field generated by the transmitting transducer 95 along phase paths $\phi 1$ and $\phi 2$. If the target moves, the phase sensitive detectors 100 and 104 measure the respective phase changes and the software in the microprocessor 107 converts the coordinates of the target to cursor commands as described above with respect to the embodiments of FIGS. 2 and 6. In general, the embodiment of FIG. 9 does not require timing unless it is modified to use two frequencies to avoid cancellations or to multiplex a single receiver to save on hardware costs, in which cases, the processor simply alternately frequency-shifts the oscillator or switches the receiver between the two receiving transducers 91 and 92 or both.

While several embodiments of the present invention using acoustic tranducers with single and multiple frequency pulses is described above, various modifications may be made thereto without departing from the spirit and scope of the present invention. For example, instead of using acoustic transducers, apparatus according to the present invention could use passive infrared (IR) apparatus which would rely on the temperature difference between an operator's finger and the background as seen by the scanning beams of two IR detectors. In this embodiment, the beams could be formed by parabolic reflectors with the IR detectors at the focal points and could be scanned by rotating mirrors. Data from the sensors would be processed to remove the background temperature pattern and would then be in the form of two angles which would define the finger position.

Instead of a passive IR system, an active IR or light system could also be used. In this embodiment, the background pattern would be more tractable. Pulses could be employed and made short enough (for instance, 10 nanoseconds) to discriminate against ceiling echoes. In practice, an active system would probably consist of two scanning beams. A single beam, pulse, IR or light system could theoretically be constructed to provide range-angle data, rather than angle-angle data from a two beam system, but the speed of light (and IR) is so great that it would require very short pulses (less than 10 picoseconds) and wide bandwidths. On the other hand, with apparatus capable of handling bandwidths of 100 GHz, one could forsake a directional, scanning approach altogether and use a range-range system with beam shapes similar to that of the sonar systems described above.

Many of the above-described considerations apply equally well to the use of a simple-pulse microwave radar system. The same 100 GHz bandwidths would be required, and the aperture sizes and shapes would be identical to those for the acoustic radar (sonar) system.

A phase-path microwave system could provide range-range data while using much longer pulses (1 nanosecond) and a bandwidth of only 1 GHz, just enough time resolution to permit the receiver to recover for short-range echoes. Even for this case, however, the operating frequency would have to be uncomfortably high (for instance, 30 GHz) in order to form a 10-degree beam within the size restriction of a keyboard installation. Still, 30 GHz systems are becoming simpler and there is no doubt that a system of this design could be constructed. The most practical microwave system, at least at the present state of technology, would consist of two bistatic CW radars. The system would still have to operate at 30 GHz or higher in order to form thin beams, but the problem of enormous system bandwidth would disappear. Such a system would simply be the microwave equivalent of the acoustic embodiment of FIG. 9.

Presently, range-range detection eliminates problems associated in range-angle detection systems associated with accurate beam-scanning apparatus.

In addition to the above-described modifications, it should be understood that, while the invention is described with respect to a computer terminal, it may be incorporated in any apparatus having an operator interface comprising a keyboard and display screen with a movable graphic element.

For the foregoing reasons, the embodiments of the present invention described above should be considered only as illustrating the present invention and the scope of the invention should be determined by reference to the claims hereinafter provided.

What is claimed is:

1. A control system for use with a display screen having a movable graphic element comprising:
    a keyboard;
    means for generating a field of signals which extends generally vertically from the rear of said keyboard; and
    means responsive to reflections of said signals from an object moving in said field for changing the position of said graphic element on said display screen from a first position to a second position as a function of the direction and speed of movement of said object in said field.

2. A system according to claim 1 wherein said object comprises an operator's finger in said field.

3. A system according to claim 1 wherein said field generating means comprises a plurality of spaced transducers.

4. A system according to claim 3 comprising means coupled to each of said transducers for providing therefrom a plurality of pulses, each of said pulses comprising a predetermined pulse width and a predetermined frequency.

5. A system according to claim 4 wherein said pulse providing means coupled to each of said plurality of transducers comprises means for providing said pulses at a predetermined pulse rate and with a predetermined interval therebetween.

6. A system according to claim 5 wherein said pulses comprise acoustic pulses and said predetermined frequency comprises a predetermined inaudible frequency.

7. A system according to claim 6 wherein said predetermined frequency is approximately 200 KHz.

8. A system according to claim 5 wherein said predetermined pulse rate is greater than ten pulses per second and said predetermined interval is greater than one millisecond.

9. A system according to claim 8 wherein said predetermined pulse rate is approximately 200 pulses per second and said predetermined interval is greater than four milliseconds.

10. A system according to claim 1 wherein said field generating means comprises means for providing a plurality of acoustic signals above said keyboard and said graphic element position changing means comprises means responsive to reflections of said plurality of acoustic signals from said object in said field.

11. A system according to claim 10 wherein said signal providing means comprises means for providing a plurality of pulses having a predetermined pulse width and a predetermined frequency with a predetermined interval between said pulses and said signal reflection responsive means comprises means responsive to reflections of said pulses from said object in said field during said predetermined interval.

12. A system according to claim 11 wherein said pulse providing and said graphic element position changing means comprises a plurality of monostatic sonars.

13. A system according to claim 11 wherein said pulse providing and graphic element position changing means comprises a plurality of bistatic sonars.

14. A system according to claim 12 wherein said monostatic sonars comprise at least one pair of spaced transducers.

15. A system according to claim 13 wherein said bistatic sonars comprise at least one transmitting transducer and at least one receiving transducer.

16. A system according to claim 10 wherein said signal providing and signal reflection responsive means comprises transducer means located in said keyboard and means for detecting the position of said object relative to said transducer means.

17. A system according to claim 16 wherein said transducer means comprises a pair of transducers adapted to transmit and receive acoustic pulses.

18. A system according to claim 16 wherein said transducer means comprises at least one transducer adapted for transmitting acoustic pulses and at least one transducer adapted for receiving acoustic pulses.

19. A system according to claim 17 wherein said transducer means comprises a pair of laterally spaced transducers.

20. A system according to claim 18 wherein said transducer means comprises three laterally spaced transducers.

21. A control system for use with a screen having a movable graphic element comprising:
a keyboard;
means for generating a planar field of first signals which extend generally vertically from said keyboard;
means for detecting an echo of said first signals from an object moving in said planar field of first signals;
means responsive to said detecting means for providing a second signal corresponding to a change in the position of said object in said field of first signals; and
means responsive to said second signal for changing the position of said graphic element on said screen from a first position to a second position as a function of said change in position of said object in said field of first signals.

22. A system according to claim 21 wherein said signal generating and detecting means comprise sonar transducer means and said signal and graphic element movement providing means comprises a programmed microprocessor means.

23. A system according to claim 22 wherein said sonar transducer means comprises transducer means adapted for transmitting and receiving acoustic pulses.

24. A system according to claim 22 wherein said sonar transducer means comprises a first transducer means adapted for transmitting acoustic pulses and a second transducer means spaced from said first transducer means for receiving acoustic pulses.

25. A system according to claim 21 wherein said means for generating said first signals comprises means for generating a continuous wave signal and said means for providing said second signal comprises means which is responsive to said echo detecting means for providing a signal corresponding to a change in the phase of said echo due to said change in the position of said object in said field.

26. A system according to claim 25 wherein said means for generating said first signals comprises an oscillator and said means for providing said second signal comprises a phase detector means which is responsive to a difference in phase between an output of said oscillator and said echo.

27. A system according to claim 26 wherein said echo comprises a first and a second echo and said phase detector means comprises a first and a second phase detector, each of which is responsive to a difference in phase between said output of said oscillator and said first and said second echoes, respectively.

28. A control system for use with a screen having a movable graphic element comprising:
a keyboard;
means for generating a field of signals which extend from said keyboard;
means for detecting an echo of said signals from an object moving in said field;
means responsive to said detecting means for changing the position of said graphic element on said screen from a first position to a second position as a function of said change in position of said object in said field, said change in position of said graphic element on said screen being independent of the starting point of said change in position of said object in said field.

29. A system according to claim 28 wherein the magnitude of said change in position of said graphic element on said screen is a function of the speed of said change in position of said object in said field.

30. A system according to claim 29 wherein said magnitude increases as said speed increases.

31. A control system for use with a display screen having a movable graphic element comprising:
a keyboard;
a plurality of spaced transducers for generating a field of signals which extends generally vertically from the rear of said keyboard;
means coupled to each of said transducers for providing therefrom a plurality of pulses at a predetermined pulse rate and with a predetermined interval therebetween, each of said pulses comprising a predetermined pulse width and a predetermined frequency;

means for dithering said predetermined interval between said pulses to permit signal processing software to discriminate against an undesired, around-the-timebase echo reflected from an object struck by said pulses; and means responsive to reflections of said signals from an object moving in said field for changing the position of said graphic element on said display screen from a first position to a second position as a function of the direction and speed of movement of said object in said field.

32. A control system for use with a display screen having a movable graphic element comprising:
   a keyboard;
   means for generating a field of acoustic pulses having a predetermined pulse width and a predetermined frequency with a predetermined interval between said pulses which extends generally vertically from the rear of said keyboard;
   means responsive to reflections of said acoustic pulses from a first object moving in said field for changing the position of said graphic element on said display screen from a first position to a second position as a function of the direction and speed of movement of said object in said field; and
   means for dithering said predetermined interval between said pulses to permit signal processing software to discriminate against an undesired, around-the-timebase echo reflected from a second object in said field.

* * * * *